United States Patent
Lee

(10) Patent No.: US 9,627,899 B2
(45) Date of Patent: *Apr. 18, 2017

(54) MOBILE TERMINAL AND INTERFACE METHOD THEREOF

(71) Applicant: Samsung Electronics Co., Ltd., Suwon-si, Gyeonggi-do (KR)

(72) Inventor: Jong Hyun Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/705,499

(22) Filed: May 6, 2015

(65) Prior Publication Data

US 2015/0263555 A1 Sep. 17, 2015

Related U.S. Application Data

(63) Continuation of application No. 13/413,167, filed on Mar. 6, 2012, now Pat. No. 9,037,756.

(30) Foreign Application Priority Data

Mar. 21, 2011 (KR) ........................ 10-2011-0024814

(51) Int. Cl.
*G06F 13/38* (2006.01)
*H02J 7/00* (2006.01)
(Continued)

(52) U.S. Cl.
CPC .......... *H02J 7/0044* (2013.01); *G06F 13/382* (2013.01); *H02J 7/0008* (2013.01);
(Continued)

(58) Field of Classification Search
CPC ...... G06F 13/382; G06F 11/3485; G06F 1/26; H02J 7/0044; H02J 3/008
See application file for complete search history.

(56) References Cited

U.S. PATENT DOCUMENTS 5,859,522 A 1/1999 Theobald
5,917,759 A * 6/1999 Akashi ................ G11C 7/1078
365/189.07

(Continued)

FOREIGN PATENT DOCUMENTS

CN 2660763 Y 12/2004
GB 2 389 429 A 12/2003
(Continued)

*Primary Examiner* — Henry Tsai
*Assistant Examiner* — John Roche
(74) *Attorney, Agent, or Firm* — Jefferson IP Law, LLP

(57) ABSTRACT

A mobile terminal and an interface method thereof for connecting external devices, such as an adapter, a Universal Serial Bus (USB) cable, a docking station, an accessory, and the like, to the mobile terminal are provided. The mobile terminal includes a battery, a connector including a pin for data communication and first and second power pins for charging the battery, a memory for storing a reference voltage indicating a dedicated adapter of the battery, and a controller for receiving a voltage input from the first and second power pins, for recognizing an external device connected with the connector as the dedicated adapter when a voltage input from the pin for data communication is the reference voltage, and for charging the battery with power input to the first and second power pins.

16 Claims, 10 Drawing Sheets

(51) Int. Cl.
*G06F 1/26* (2006.01)
*G06F 11/34* (2006.01)
*H02J 3/00* (2006.01)
*H04M 1/725* (2006.01)
*H04M 1/02* (2006.01)

(52) U.S. Cl.
CPC .............. *H02J 7/0027* (2013.01); *G06F 1/26* (2013.01); *G06F 11/3485* (2013.01); *H02J 3/008* (2013.01); *H02J 7/0047* (2013.01); *H04M 1/0274* (2013.01); *H04M 1/72527* (2013.01)

(56) References Cited

U.S. PATENT DOCUMENTS

| | | | |
|---|---|---|---|
| 2004/0251878 A1* | 12/2004 | Veselic | H02J 7/00 320/141 |
| 2007/0082634 A1 | 4/2007 | Thijssen et al. | |
| 2007/0132733 A1* | 6/2007 | Ram | G06F 3/0227 345/163 |
| 2007/0145945 A1 | 6/2007 | McGinley et al. | |
| 2007/0213092 A1 | 9/2007 | Geelen | |
| 2008/0090615 A1 | 4/2008 | Lee et al. | |
| 2008/0211780 A1 | 9/2008 | Bell et al. | |
| 2008/0272835 A1 | 11/2008 | Smit et al. | |
| 2009/0184688 A1 | 7/2009 | Kim et al. | |
| 2010/0007355 A1 | 1/2010 | Olgaard et al. | |
| 2011/0098085 A1* | 4/2011 | Stenmark | H04M 1/72527 455/557 |
| 2011/0181116 A1* | 7/2011 | Takeuchi | G03G 15/5004 307/75 |
| 2011/0221604 A1* | 9/2011 | Johnson | G06F 1/266 340/664 |
| 2012/0071215 A1 | 3/2012 | Bourque et al. | |

FOREIGN PATENT DOCUMENTS

| | | |
|---|---|---|
| KR | 10-2004-0061737 A | 7/2004 |
| KR | 10-0793071 B1 | 1/2008 |
| KR | 10-2009-0079458 A | 7/2009 |
| RU | 2 345 507 C2 | 1/2009 |
| RU | 2 369 980 C2 | 10/2009 |
| WO | 0065445 A1 | 11/2000 |

* cited by examiner

MOBILE TERMINAL AND INTERFACE METHOD THEREOF

PRIORITY

This application is a continuation application of a prior application Ser. No. 13/413,167, filed on Mar. 6, 2012, which claimed the benefit under 35 U.S.C. §119(a) of a Korean patent application filed on Mar. 21, 2011 in the Korean Intellectual Property Office and assigned Serial No. 10-2011-0024814, the entire disclosure of each of which is hereby incorporated by reference.

BACKGROUND OF THE INVENTION

1. Field of the Invention

The present invention relates to a mobile terminal and an interface method thereof. More particularly, the present invention relates to a mobile terminal and an interface method thereof for connecting external devices, such as an adapter, a Universal Serial Bus (USB) cable, a docking station, an accessory, and the like, to the mobile terminal.

2. Description of the Related Art

A mobile terminal may be a smart phone, a Personal Digital Assistant (PDA), a video game machine, a Digital Multimedia Broadcasting (DMB) receiver, a Motion Pictures Expert Group (MPEG) Audio Layer-3 (MP3) player, a camera, and the like. The mobile terminal needs a charging connector for charging a battery. Furthermore, the mobile terminal may include a connector for exchanging data with the external device. In addition, the mobile terminal may include various connectors according to a type thereof.

In recent years, there is a need for extension of an interface in the mobile terminal. For example, the mobile terminal needs to include a low voltage charging connector and a high voltage charging connector in consideration of a charging time and capacity of a battery. Furthermore, the mobile terminal needs to include various types of connectors, such as an audio input/output connector and a video input/output connector. With regard to an extension request, if the mobile terminal includes various types of connectors, an external appearance thereof may look poor. Furthermore, there is much limitation to design the size and thickness.

Therefore, a need exists for a mobile terminal for implementing various interfaces by one connector and a method thereof.

SUMMARY OF THE INVENTION

Aspects of the present invention are to address the above-mentioned problems and/or disadvantages and to provide at least the advantages described below. Accordingly, an aspect of the present invention is to provide a mobile terminal for implementing various interfaces by one connector and a method thereof.

Another aspect of the present invention is to provide a mobile terminal for recognizing a type of an external device connected to one connector.

In accordance with an aspect of the present invention, a mobile terminal is provided. The terminal includes a battery, a connector including a pin for data communication and first and second power pins for charging the battery, a memory for storing a reference voltage indicating a dedicated adapter of the battery, and a controller for recognizing an external device connected with the connector as the dedicated adapter when a voltage is input from the first and second power pins and a voltage input from the pin for data communication is the reference voltage, and for charging the battery by power input to the first and second power pins.

The connector may further comprise a battery pin for receiving power during a process or development, a jig on pin for reporting power reception from the first and second power pins to an exterior, and a pin for transmitting and receiving a testing signal.

In accordance with another aspect of the present invention, a mobile terminal is provided. The terminal includes a connector including a pin for detecting an accessory and a pin for identifying the accessory, a memory for storing a reference table and for identifying the accessory, and a controller for comparing a voltage input from the pin and for identifying the accessory with the reference table when a voltage input from the pin for detecting the accessory changes to recognize a type of an accessory connected with the connector.

In accordance with another aspect of the present invention, an interface method of a mobile terminal including a connector with a pin for data communication and first and second power pins for charging the battery of the mobile terminal is provided. The method includes determining whether a voltage input from the pin for data communication is a predefined reference voltage when a voltage is input from the first and second power pins, recognizing an external device connected with the connector as a dedicated adapter of a battery when the voltage input from the pin for data communication is the predefined reference voltage, and charging the battery with power input from the first and second power pins when the external device connected with the connector is recognized as the dedicated adapter of the battery.

Exemplary embodiments of the present invention may implement various interfaces by one connector and recognize a type of an external device connected to the connector. Moreover, exemplary embodiments of the present invention may use one connector as a testing port from a developing stage of a product to a production stage thereof and various types of adaptors may connect with one connector to charge a battery. Exemplary embodiments of the present invention have an effect that consumers may connect various accessories to the mobile terminal to use it.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1A:
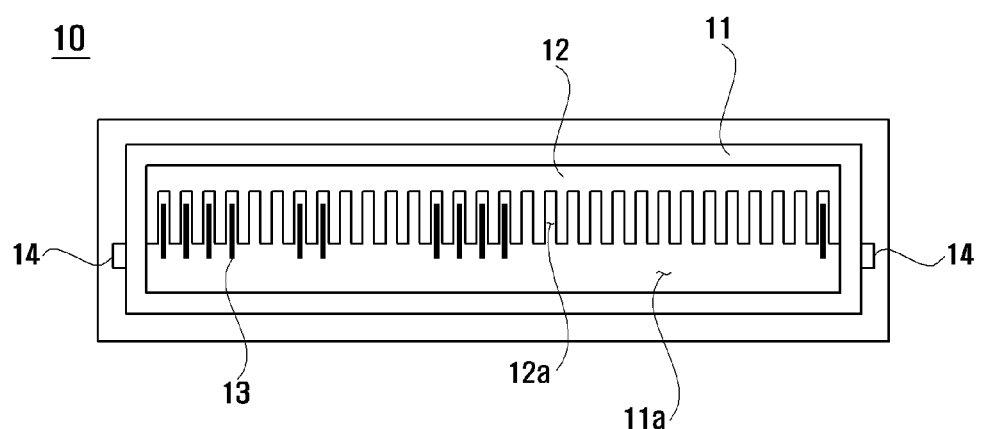
FIG. 1A is an elevated view illustrating a male connector according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a mobile terminal and an interface method thereof for connecting external devices, such as an adapter, a Universal Serial Bus (USB) cable, a docking station, an accessory, and the like, to the mobile terminal.

FIGS. 1A through 10, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

Figure 1B:
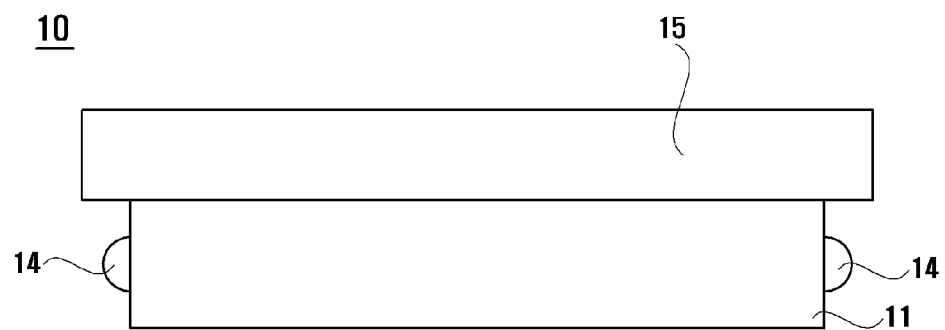
FIG. 1B is a plan view illustrating a male connector according to an exemplary embodiment of the present invention.

FIG. 1A is an elevated view illustrating a male connector according to an exemplary embodiment of the present invention. FIG. 1B is a plan view illustrating a male connector according to an exemplary embodiment of the present invention.

Referring to FIGS. 1A and 1B, a male connector 10 may include a housing 11, a pin positioning portion 12, a plurality of pins 13, elastic portions 14, and a frame 15. The pin positioning portion 12 is disposed inside the housing 11. The plurality of pins 13 are disposed in a plurality of grooves 12a that are formed at the pin positioning portion 12. The elastic portions 14 are disposed at both sides of the housing 11. The frame 15 supports the housing 11.

In the foregoing construction, as shown in FIG. 1A, a front surface of the housing 11 is open such that the housing 11 connects with a female connector. The pin positioning portion 12 is disposed inside the housing 11. Furthermore, the housing 11 forms a space 11a therein such that a pin positioning portion of a female connector, to be described later, may be inserted in the housing 11 to contact with the pin positioning portion 12 of the mail connector 10 side.

The plurality of pins 13 are disposed in a plurality of grooves 12a, which are formed at the pin positioning portion 12. The number of the plurality of grooves 12a may be thirty. However, the number of the grooves 12a is not limited thereto but may be modified by design. Here, the pins 13 may be disposed in the plurality of grooves 12a, but maybe disposed in some of them as shown in FIG. 1A. In other words, the number of the pins 13 may be determined according to utilization of the male connector 10. For example, if a cable including the male connector 10 is limited only for data communication, it is unnecessary to dispose pins 13 in all of the grooves 12a. That is, it would be sufficient to dispose pins 13 in only corresponding grooves 12a.

A plurality of pins 13 have elasticity and partially protrude from the grooves 12a to an exterior, as shown in FIG. 1A. When being inserted into the housing 11, a pin positioning portion of a female connector side adheres tightly to a pin of a female connector side.

The elastic portions 14 enable the male connector 10 to be tightly inserted in a female connector. The elastic portions 14 are disposed in grooves (not shown) formed at both sides of the housing 11 and partially protrude to the outside, as shown in FIG. 1A and FIG. 1B.

Figure 2A:
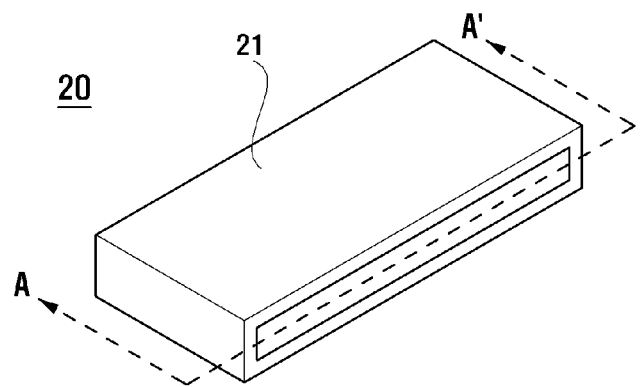
FIG. 2A is a perspective view illustrating a female connector according to an exemplary embodiment of the present invention.
Figure 2B:
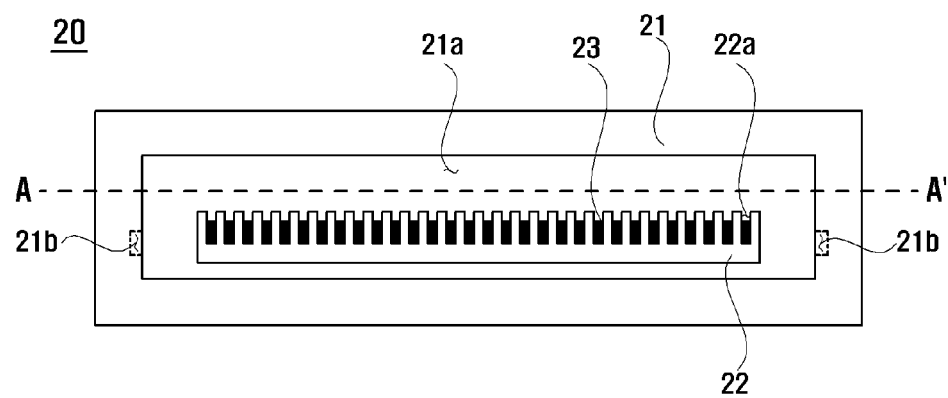
FIG. 2B is an elevated view illustrating a female connector according to an exemplary embodiment of the present invention.
Figure 2C:
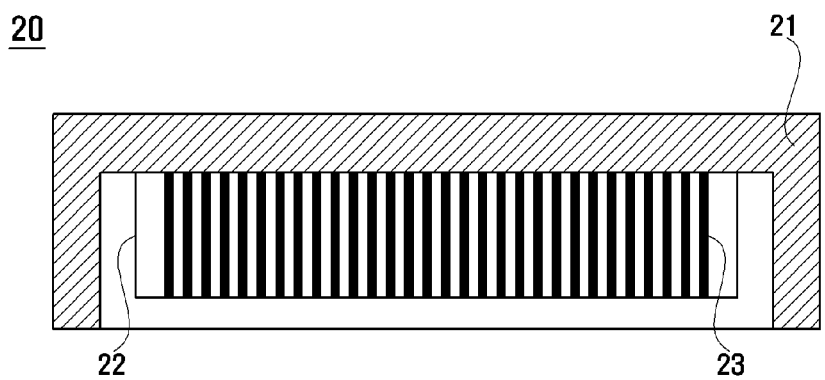
FIG. 2C is a fragmentary sectional view illustrating a female connector taken along dotted line A-A' according to an exemplary embodiment of the present invention.

FIG. 2A is a perspective view illustrating a female connector according to an exemplary embodiment of the present invention. FIG. 2B is an elevated view illustrating a female connector according to an exemplary embodiment of the present invention. FIG. 2C is a fragmentary sectional view illustrating a female connector taken along dotted line A-A' according to an exemplary embodiment of the present invention.

Referring to FIGS. 2A, 2B, and 2C, a female connector 20 may include a housing 21, a pin positioning portion 22, and a plurality of pins 23. The pin positioning portion 22 is disposed inside the housing 21. The plurality of pins 23 are disposed in a plurality of grooves 22a which are formed at the pin positioning portion 22.

In the foregoing structure, the housing 21 forms a space 21a therein and a front surface thereof is open such that the housing 11 of the male connector 10 may be inserted in the housing 21 of the female connector 20. Furthermore, as shown in FIG. 2B, grooves 21b are formed at both inner sides of the housing 21. In this case, the elastic portions 14 are inserted in the grooves 21b. As previously illustrated, the elastic portions 14 are inserted in the grooves 21b. Accordingly, unless a user pulls out the male connector 10, the male connector 10 is tightly inserted in the female connector 20.

The plurality of pins 23 are disposed in a plurality of grooves 22a, which are formed at the pin positioning portion 22. The number of a plurality of grooves 22a is the same as that of a plurality of grooves 12a.

Pins 23 may be disposed in the plurality of grooves 22a, as shown in FIG. 2B, or in some of grooves 22a. A mobile terminal mounts the female connector 20 rather than the male connector 10. Consequently, for extension of an interface, pins are disposed in all of a plurality of grooves 22a.

The plurality of pins 23 are disposed inside the pin positioning portion 22. When the housing 11 of the male connector 10 is inserted into the housing 21 of the female connector 20, the plurality of pins 23 contact with the plurality of pins 13.

Table 1 below illustrates functions of pins according to an exemplary embodiment of the present invention. As listed in Table 1, the number of the pins is thirty. All or some of the pins are disposed at the connectors 10 or 20. In the following Table 1, Pin No. means a location of a pin in a connector. A first pin is located in a groove formed at a rightmost side of the pin positioning portion 12 or 22. A pin having a Pin No. of a thirtieth pin is located in a groove formed at a leftmost side of the pin positioning portion 12 or 22.

TABLE 1

| Pin No. | Signal Name | Functions |
| --- | --- | --- |
| 1 | GND | GND |
| 2 | GND | GND |
| 3 | USB D+ | + line of the differential bi-directional USB signal |
| 4 | USB D− | − line of the differential bi-directional USB signal |
| 5 | JIG ON | Power on pin for a process |
| 6 | Accessory Power | Power supply pin (3.3 V, 150 mA) to accessory |
| 7 | VBUS | TA/USB Cable charging power |
| 8 | VBUS | TA/USB Cable charging power |
| 9 | Battery | V_BAT for a process and development |
| 10 | Battery | V_BAT for a process and development |
| 11 | Charging 12 V, 2 A | For charging large capacity (8~15 V DC) |
| 12 | Charging 12 V, 2 A | For charging large capacity (8~15 V DC) |
| 13 | Accessory ID | Accessory/USB ID (distinguish by ADC) |
| 14 | Accessory Detect | Pull-up→Accessory insertion→recognize GND |

TABLE 1-continued

| Pin No. | Signal Name | Functions |
| --- | --- | --- |
| 15 | GND | GND |
| 16 | GND | GND |
| 17 | MHL D+ | Differential MHL + output |
| 18 | MHL D− | Differential MHL − output |
| 19 | CBUS | For implementing MHL ID |
| 20 | UART RX | UART RX |
| 21 | UART TX | UART TX |
| 22 | Reserved | Reserved |
| 23 | Composite Video | Analog Video Output |
| 24 | Remote Sense | Keypad input (distinguish by ADC port) |
| 25 | LINE-IN L | Audio Input |
| 26 | LINE-IN R | Audio Input |
| 27 | LINE-OUT L | Audio Output |
| 28 | LINE-OUT R | Audio Output |
| 29 | Reserved | Reserved |
| 30 | GND | GND |

Hereinafter, an adapter, a docking station, an accessory, and a mobile terminal, according to an exemplary embodiment of the present, will be described based on the foregoing connector and Table 1.

Figure 3:
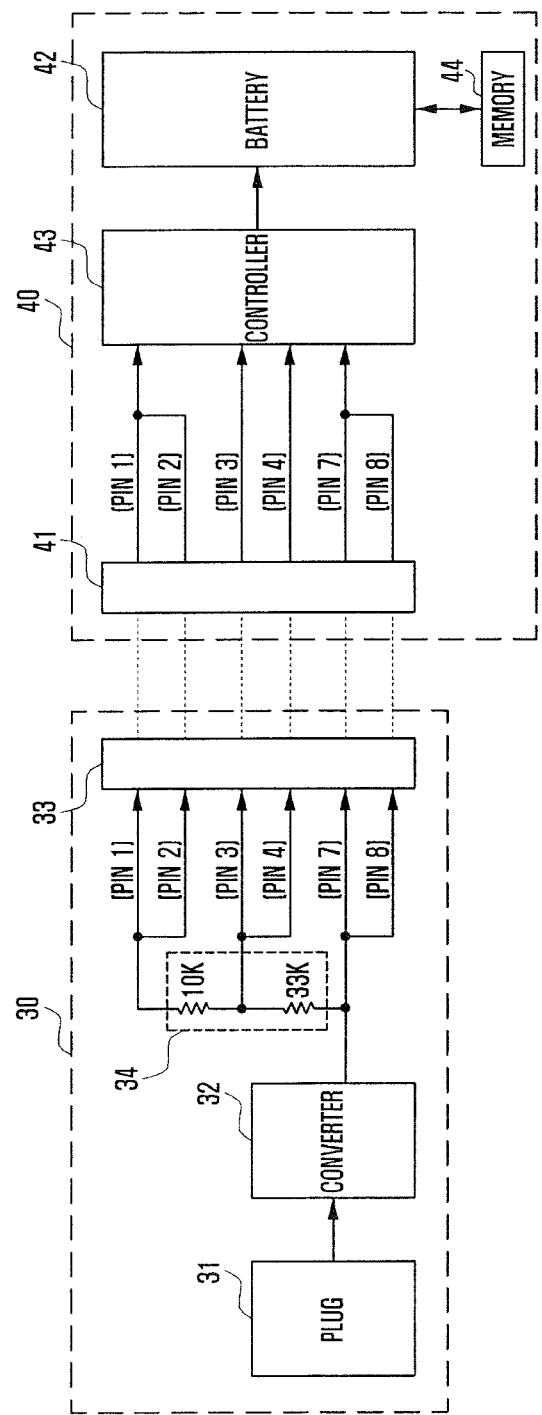
FIG. 3 is a block diagram illustrating an adapter and a mobile terminal according to an exemplary embodiment of the present invention.

FIG. 3 is a block diagram illustrating an adapter and a mobile terminal according to an exemplary embodiment of the present invention.

Referring to FIG. 3, an adapter 30 may include a plug 31, a converter 32, a connector 33, and a boost circuit 34. The plug 31 connects with an outlet that supplies an Alternating Current (AC) power. The converter 32 converts the AC power input from the plug 31 into a Direct Current (DC) power (e.g., 5V/2 A). The connector 33 includes the first, second, third, fourth, seventh, and eighth pins. The boost circuit 34 boosts the DC power input from the converter 32 to, for example, 1.16V and outputs the boosted voltage to the third and fourth pins. The boost circuit 34 boosts the DC power to a Ground (GND) and outputs the boosted power to the first and second pins. Here, the converted DC power from the converter 32 bypasses the seventh and eighth pins.

Furthermore, the adapter 30 may be used for charging large capacity. The converter 32 may convert AC power into, for example, 12V/2 A, 12V/5 A for charging large capacity, and output converted power to twelfth and thirteenth pins being pins for charging large capacity instead of the seventh and eighth pins. The adapter 30 may further include a converter for charging large capacity as well as the converter 32. The converter for charging large capacity may be connected with twelfth and thirteenth pins.

Moreover, because the adapter 30 includes an additional connector as well as the connector 33, it may be used as a data cable capable of performing data communication between two devices. As a result, the adapter 30 may transmit and receive data through the third and fourth pins of the connector 33.

As illustrated in FIG. 3, a mobile terminal 40 may include a connector 41, a battery 42, a memory 44, and a controller 43. The controller 43 recognizes a type of an external device connected to the connector 41 and charges the battery based on the recognized information. The connector 41 may include all of thirty pins for extension of an interface.

The following are main functions of the controller 43. If a voltage is applied to a Voltage BUS (VBUS) connected to first and second pins, the controller 43 determines whether a differential signal is input through USB D+ and D− lines connected to the third and fourth pins, respectively. If the differential signal is not input, the controller 43 recognizes a connected external device as an adapter. If the differential signal is input, the controller 43 recognizes the external device as a USB data cable with a charging function. If charging power input from the seventh and eighth pins is in the range of rated power, for example, from 5 W to 20 W, the controller 43 charges the battery 42. On the other hand, if the charging power input from the seventh and eighth pins is beyond the range of rated power, the controller 43 does not charge the battery 42. For example, if the input charging power is less than 5 W, the controller 43 recognizes that a charging time is long and does not charge the battery 42. If the input charging power is greater than 5 W, the controller 43 recognizes that the battery life shortens due to overcharging and does not charge the battery 42.

Furthermore, the controller 43 determines whether a connected adapter is a dedicated adapter suitable for rated power of the mobile terminal 40. As the determined result, if the connected adapter is the dedicated adapter, the controller 43 charges the battery 42. If the connected adapter is a non-dedicated adapter, the controller 43 does not charge the battery 42. In the foregoing procedure, if the external device is recognized as the adapter, the controller 43 determines a voltage of USB D+ and D− lines. If the determined voltage is, for example, 1.16V in consideration of a set error range, the controller 43 recognizes that the connected adapter is the dedicated adapter. Here, a reference voltage 1.16V is stored in a memory 44. That is, the controller 43 compares a voltage of USB D+ and D− lines with the reference voltage stored in the memory 44. If the voltage of USB D+ and D− lines is identical with the reference voltage, the controller 43 recognizes that an adapter connected to the connector 41 is a dedicated adapter. On the other hand, if the determined voltage is not 1.16V, the controller 43 recognizes that the connected adapter is the non-dedicated adapter and does not charge the battery 42. Although the connected adapter is the non-dedicated adapter, the controller 43 may also charge the battery 42. If charging power input from the seventh and eighth pins is in the range of rated power, the controller 43 may charge the battery 42.

Moreover, the controller 43 may include a charging circuit that reduces or increases a voltage or an electric current to charge the battery 42. The charging circuit may be included in the adapter 30 instead of the mobile terminal 40. Such an adapter refers to a charger distinguished from an adapter without the charging circuit.

Furthermore, the controller 43 may charge the battery 42 within a short time using charging power input from the twelfth and thirteenth pins. However, as previously illustrated, for example, when the charging power is equal to or greater than 30 W to excessively charge the battery 42, the controller 43 may reduce a voltage or an electric current.

Furthermore, the controller 43 may receive power from ninth and tenth pins. Since the received power is used to manufacture or develop the mobile terminal 40, it cannot charge the battery 42. When the controller 43 receives power from the ninth and tenth pins, it outputs a signal indicating that the mobile terminal 40 is under testing to an external device through a fifth pin. Furthermore, when the mobile terminal 40 is under testing, the controller 43 may transmit and receive a Universal Asynchronous Receiver/Transmitter (UART) signal being a testing signal through twentieth and twenty-first pins.

Figure 4:
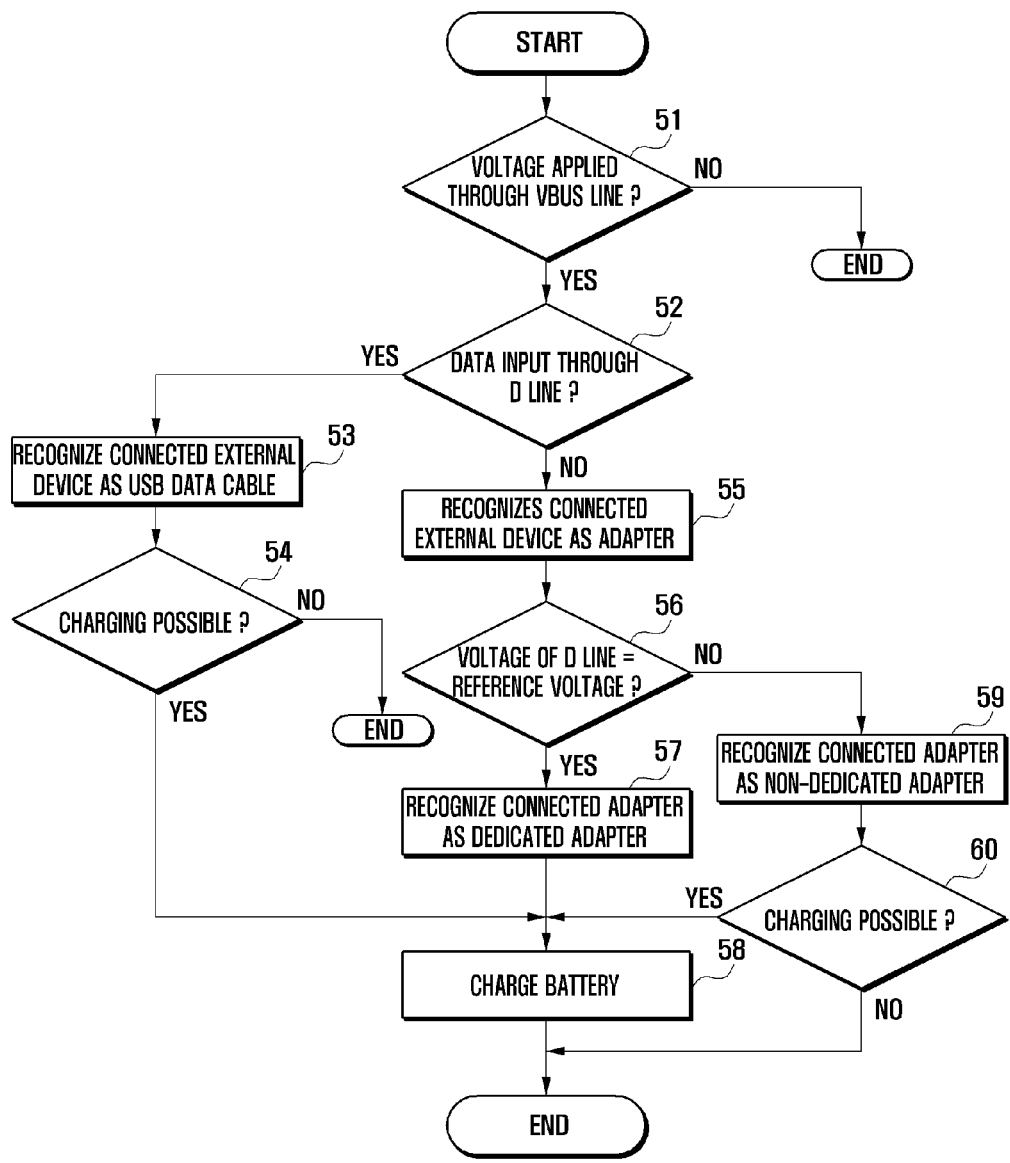
FIG. 4 is a flowchart illustrating an interface method of a mobile terminal according to an exemplary embodiment of the present invention.

FIG. 4 is a flowchart illustrating an interface method of a mobile terminal according to an exemplary embodiment of the present invention.

Referring to FIG. 4, a controller 43 determines whether a voltage is applied through a VBUS line in step 51. If it is determined in step 51 that the voltage is applied through a VBUS line, the controller 43 determines whether data (differential signal) is input through a D line (USB D+ and D− lines) in step 52. If it is determined in step 52 that the data is input through a D line, the controller 43 recognizes an external device connected to a connector 41 as a USB data cable in step 53, and the process proceeds to step 54. The controller 43 determines whether it is possible to charge the battery 42 in step 54. Here, whether it is possible to charge the battery 42 was described earlier. Accordingly, a description thereof is omitted. If it is determined in step 54 that it is possible to charge the battery 42, the controller 43 charges the battery 42 in step 58.

In contrast, if it is determined in step 52 that the data is not input through a D line, the controller 43 recognizes the external device connected to the connector 41 as an adapter in step 55, and the process proceeds to step 56. The controller 43 determines whether a voltage of a D line is a reference voltage, for example, 1.16V in step 56. If it is determined in step 56 that the voltage of the D line is the reference voltage, the controller 43 recognizes the connected adapter as a dedicated adapter in step 57 and charges the battery 42 in step 58.

In contrast, if it is determined in step 56 that the voltage of the D line is not the reference voltage, the controller 43 recognizes the connected adapter as a non-dedicated adapter in step 59, and the process proceeds to step 60. The controller 43 determines whether it is possible to charge the battery 42 in step 60. If it is determined in step 60 that it is possible to charge the battery 42, the controller 43 charges the battery 42 in step 58.

Figure 5:
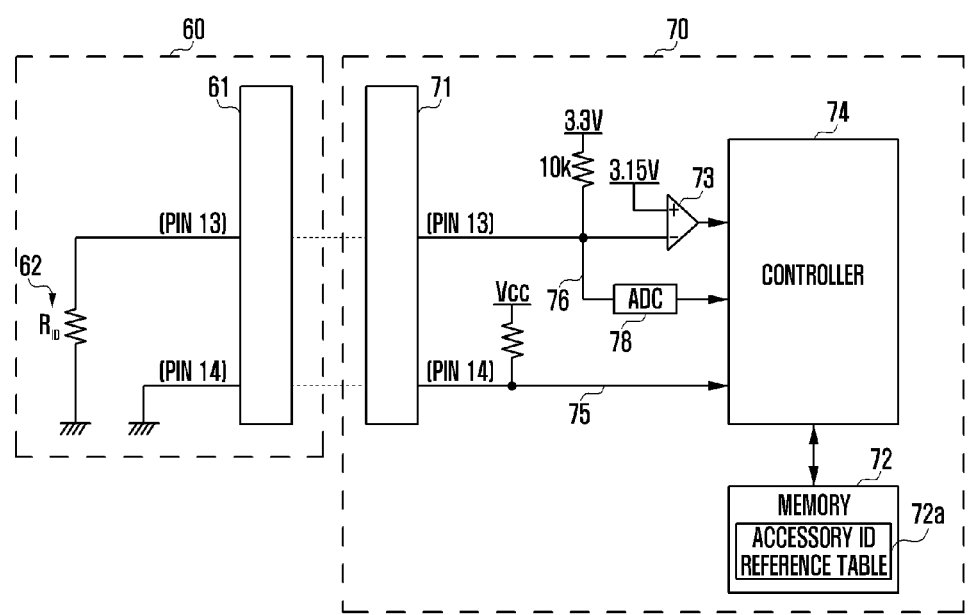
FIG. 5 is a block diagram illustrating an accessory and a mobile terminal according to an exemplary embodiment of the present invention.

FIG. 5 is a block diagram illustrating an accessory and a mobile terminal according to an exemplary embodiment of the present invention.

Referring to FIG. 5, an accessory 60 may include a connector 61 and an accessory IDentification Resistor 62 ($R_{ID}$). The accessory 60 may increase or change functions and effects of the mobile terminal 70. For example, the accessory 60 may include an earphone, a headphone, a camera, a keypad, a mouse, a docking station, a data cable, a data cable with a charging function, an adapter, a charger, an external hard disk, or a USB memory.

In the forgoing construction, the connector 61 may include thirteenth and fourteenth pins. The thirteenth pin connects with a ground through the accessory identification resistor 62 ($R_{ID}$). The fourteenth pin directly connects with the ground.

The connector 61 may include at least one pin as well as the foregoing pins. For example, when the accessory 60 is an earphone, the connector 61 further includes twenty-seventh and twenty-eighth pins. When the accessory 60 is a camera, the connector 61 further includes third and fourth pins. When it is necessary to supply power to the accessory 60, the connector 61 further includes first, second, and sixth pins. The accessory identification resistor 62 has different resistances depending on the type of accessory. For example, the resistances of the accessory identification resistor 62 may be listed in a following Table 2.

TABLE 2

| No | ID resistance (KΩ, 1%) | A/D converter input voltage (V) | Accessories |
|---|---|---|---|
| — | Open | 3.30 | Dock Station (Identify according to presence of data communication) |
| 1 | 100.0 | 3.00 | Reserved |
| 2 | 56.0 | 2.80 | Accessory for Jig |
| 3 | 36.0 | 2.58 | Reserved |
| 4 | 27.0 | 2.41 | Reserved |

TABLE 2-continued

| No | ID resistance (KΩ, 1%) | A/D converter input voltage (V) | Accessories |
|---|---|---|---|
| 5 | 20.0 | 2.20 | Camera Connection Kit |
| 6 | 15.0 | 1.98 | Reserved |
| 7 | 12.0 | 1.80 | Reserved |
| 8 | 9.1 | 1.57 | Reserved |
| 9 | 7.2 | 1.38 | Reserved |
| 10 | 5.6 | 1.18 | Reserved |
| 11 | 4.3 | 1.00 | Reserved |
| 12 | 3.1 | 0.78 | Reserved |
| 13 | 2.2 | 0.60 | Reserved |
| 14 | 1.3 | 0.38 | Reserved |
| 15 | 0.56 | 0.18 | Reserved |
| 16 | 0.0 | 0.00 | TA exceeding Reserved_10 W (24 V) |

As illustrated in FIG. 5, a mobile terminal 70 may include a connector 71, a memory 72, a comparator 73, an Analog to Digital Converter (ADC) 78, and a controller 74. The controller 74 recognizes a type of an external device connected to the connector 71 and may include all of thirty pins for extension of an interface.

The following are main functions of the controller 71. If a voltage level of an accessory detection line 75 changes from a high level Vcc to a low level GND, the controller 71 recognizes that the accessory 60 connects with the connector 71. Here, as shown in FIG. 5, the accessory detection line connects the controller 71 to a fourteenth pin and Vcc.

When a voltage level input from the comparator 73 changes from low to high, that is, when an interrupt signal is input from the comparator 73 while the mobile terminal 70 is in a sleep mode, the controller 71 wakes-up. Here, a negative (−) input terminal of the comparator 73 connects with a thirteen pin and a pull-up voltage (e.g., 3.3V) through a pull-up resistor (e.g., of 10 KΩ). A positive (+) terminal of the comparator 73 connects with a reference voltage (e.g., 3.15V). The comparator 73 compares a voltage (3.3V or $VR_{ID}$) input from the negative (−) input terminal with the reference voltage input from the positive (+) terminal. When the input voltage (3.3V or $VR_{ID}$) is less than the reference voltage, the comparator 73 outputs a high level signal. When the input voltage (3.3V or $VR_{ID}$) is equal to or greater than the reference voltage, the comparator 73 outputs a low-level signal. Here, $VR_{ID}$ means a voltage across the identification resistor 62 ($R_{ID}$).

Furthermore, the controller 71 compares a voltage input from an accessory identification line 76 connected to a thirteenth pin with a reference table 72a to recognize a type of an accessory 60 connected to the connector 71. Here, as shown in FIG. 5, one end of the accessory identification line 76 connects with the ADC 78 and another end thereof connects with a line connecting the thirteenth pin to a pull-up resistor. The ADC 78 converts an input analog signal into a digital signal, and outputs the digital signal to the controller 74. The controller 74 analyzes the digital signal input from the ADC 78 to calculate a voltage. The ADC 78 may be included in the controller 74. The reference table 72a is stored in the memory 72 as illustrated in Table 2. In exemplary embodiments of the present invention, the accessory 60 has different identification resistors $R_{ID}$ (62) by a type thereof. Accordingly, a voltage input to the controller 74 through the identification line 76 is different by accessories connected to the connector 71. When a voltage input from an accessory identification line 76 is 3.3V in a low voltage level state of an accessory detection line 75, the controller 71 recognizes a connected accessory as a docking station. When the input voltage is 2.2V, the controller 71 recognizes the connected accessory as a camera connection kit.

Figure 6:
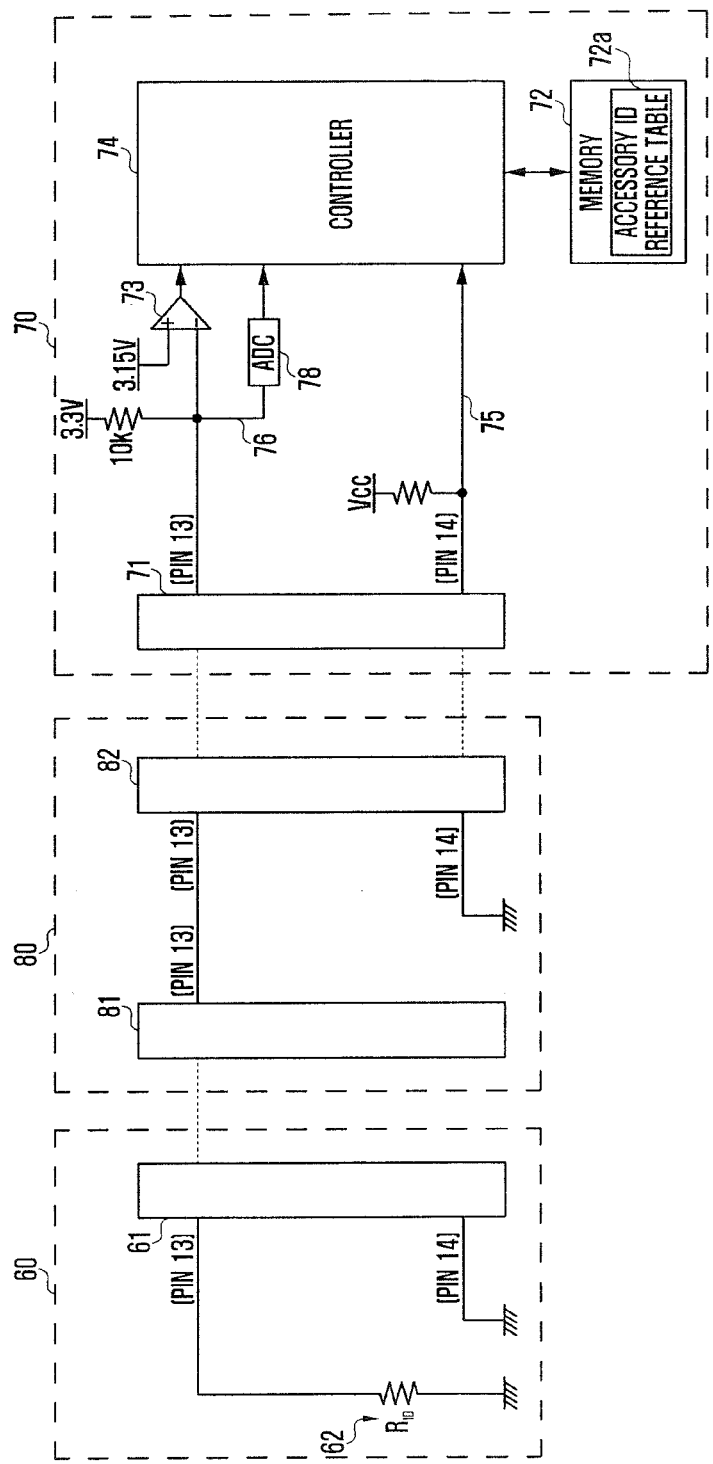
FIG. 6 is a block diagram illustrating a docking station according to an exemplary embodiment of the present invention.

FIG. 6 is a block diagram illustrating a docking station according to an exemplary embodiment of the present invention.

Referring to FIG. 6, a docking station 80 connects another accessory 60 to the mobile terminal 70. The docking station 80 may include a first connector 81 connected with another accessory 61 and a second connector 82 connected with the mobile terminal 70. The first connector 81 includes a thirteenth pin and at least one other pin. The second connector 82 includes thirteenth and fourteenth pins and at least one other pin. The thirteenth pin of the first connector 81 connects with the thirteenth pin of the second connector 82 without a separate resistor. The fourteenth pin of the second connector 82 connects with a ground.

If the accessory detection line 75 has a high-level voltage and a voltage applied from the accessory identification line 76 is a pull-up voltage (3.3V), the controller 74 recognizes that a docking station 80 connects with the connector 71 and another accessory 60 does not connect with the docking station 80.

In a state that the accessory detection line 75 has a high-level voltage and a voltage applied from the accessory identification line 76 is not a pull-up voltage (3.3V), if the voltage applied from the accessory identification line 76 changes to the pull-up voltage (3.3V), the controller 74 recognizes that another accessory 60 is removed from the docking station 80.

Figure 7:
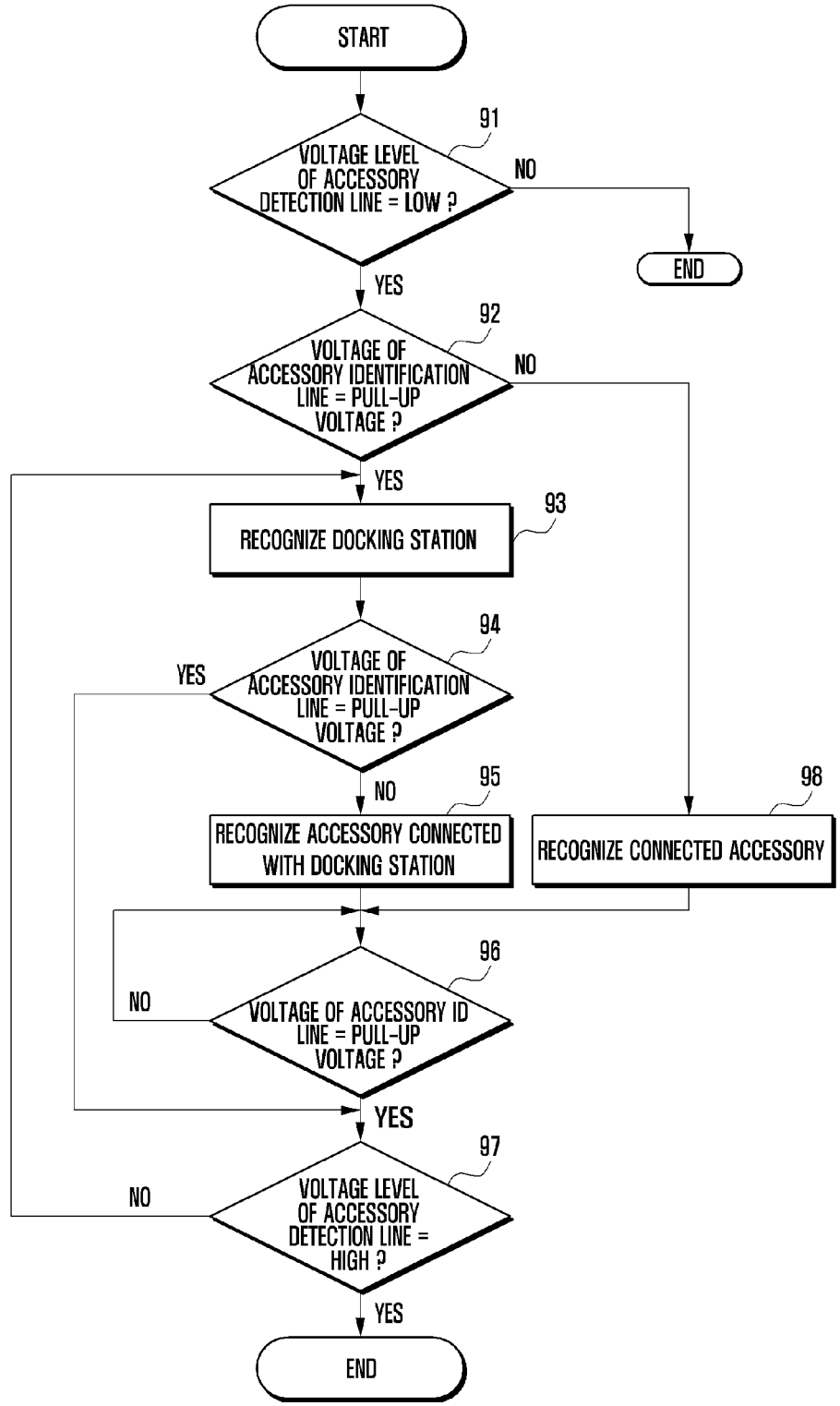
FIG. 7 is a flowchart illustrating an interface method of a mobile terminal according to an exemplary embodiment of the present invention.

FIG. 7 is a flowchart illustrating an interface method of a mobile terminal according to an exemplary embodiment of the present invention. It is assumed that the flowchart of FIG. 7 starts in an active mode capable of detecting a change in a voltage level of the accessory detection line 75 by the controller 74.

Referring to FIG. 7, a flow is illustrated in a case of connecting the accessory 60 to the mobile terminal 70 by a user, connecting the docking station 80 to the mobile terminal 70 and then connecting the accessory 60 to the docking station 80 by the user, or connecting the accessory 60 to the docking station 80 and then connecting the docking station 80 to the mobile terminal 70.

In step 91, a controller 74 determines whether a voltage level in an accessory detection line 75 is low. If it is determined in step 91 that the voltage level of the accessory detection line 75 is low, the process proceeds to step 92. The controller 74 determines whether a voltage of the accessory identification line 76 is a pull-up voltage (3.3V) in step 92.

If it is determined in step 92 that the voltage of the accessory identification line 76 is the pull-up voltage, the process proceeds to step 93. The controller 74 recognizes an accessory connected with a connector 71 as a docking station 80 in step 93, and the process proceeds to step 94. The controller 74 determines whether the accessory identification line 76 maintains the pull-up voltage (3.3V) in step 94. If it is determined in step 94 that the accessory identification line 76 does not maintain the pull-up voltage, the process proceeds to step 95. In contrast, if it is determined in step 94 that the accessory identification line 76 maintains the pull-up voltage, the process proceeds to step 97. The controller 74 recognizes a type of an accessory 60 connected with the docking station 80 in step 95, and the process proceeds to step 96. The controller 74 determines whether a voltage of the accessory identification line 76 is a pull-up voltage (3.3V) in step 96. If it is determined in step 96 that the voltage of the accessory identification line 76 is the pull-up voltage, the process proceeds to step 97. A controller 74 determines whether a voltage level of an accessory detection line 75 is high in step 97. If it is determined in step 97 that the voltage level of the accessory detection line 75 is high, the controller 74 recognizes that connection between the docking station 80 and the accessory 60 is canceled, and the process is completed. In contrast, if it is determined in step 97 that the voltage level of the accessory detection line 75 is low, the process proceeds to step 93.

On the other hand, if it is determined in step 92 that the voltage of the accessory identification line 76 is not the pull-up voltage, the process proceeds to step 98. The controller 74 recognizes a type of an accessory connected to the connector 71 by referring to the reference table 72a in step 98, and the process proceeds to step 96. In this case, the connector 71 directly connects with the accessory 60 or connects with the accessory 60 through the docking station 80.

Figure 8:
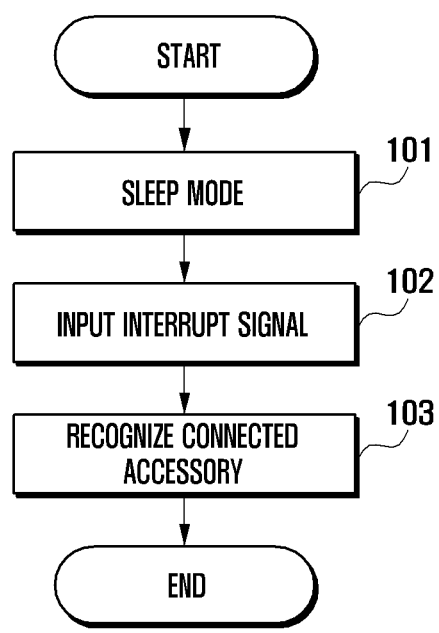
FIG. 8 is a flowchart illustrating an interface method of a mobile terminal according to an exemplary embodiment of the present invention.

FIG. 8 is a flowchart illustrating an interface method of a mobile terminal according to an exemplary embodiment of the present invention.

Referring to FIG. 8, for example, when there is no input from a user through a user interface means (e.g., a touch screen) for a predefined time, the controller 74 switches an operation mode of a mobile terminal 70 from an active mode to a sleep mode in step 101. Here, the sleep mode may be defined as a mode in which only a minimum function is performed for saving a battery resource. For example, the controller 74 closes a screen in the sleep mode. Furthermore, the controller 74 does not act on change in a voltage level of a detection line 75.

When an interrupt signal from a comparator 73 is input to the controller 74 in step 102, it cancels the sleep mode and the process proceeds to step 103. In step 103, the controller 74 recognizes a type of an accessory connected to a connector 71 by referring to a reference table 72a. In this case, the connector 71 directly connects with the accessory 60 or connects with the accessory 60 through the docking station 80.

Figure 9:
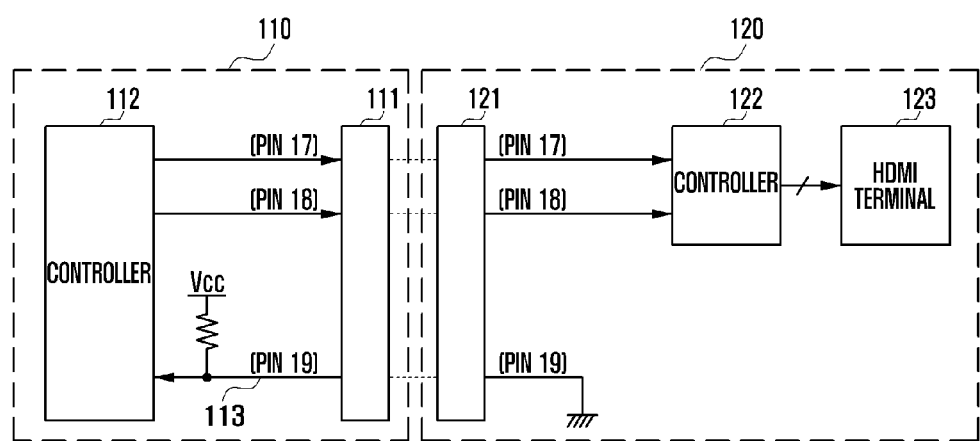
FIG. 9 is a block diagram illustrating a mobile terminal and a docking station according to an exemplary embodiment of the present invention.

FIG. 9 is a block diagram illustrating a mobile terminal and a docking station according to an exemplary embodiment of the present invention.

Referring to FIG. 9, a mobile terminal 110 may include a connector 111 and a controller 112. The connector 111 includes seventeenth, eighteenth, and nineteenth pins. The controller 112 controls output of a Mobile High-definition Link (MHL) type audio/video signal. Here, as shown in FIG. 9, an MHL identification line 113 connects the controller 112 to a nineteenth pin and Vcc.

The docking station 120 includes a connector 121, an encoder 122, and a High-Definition Multimedia Interface (HDMI) terminal 123. The connector 121 includes a seventeenth, eighteenth, and nineteenth pins. The encoder 121 converts an MHL into an HDMI and outputs the HDMI to the HDMI terminal 123. The HDMI terminal 123 connects with an HDMI cable.

If a voltage level of the MHL identification line 113 changes from high to low, the controller 112 recognizes that a docking station 120 including an encoder 112 connects with a connector 111, and outputs an MHL to the docking station 120 through seventeenth and eighteenth pins.

Figure 10:
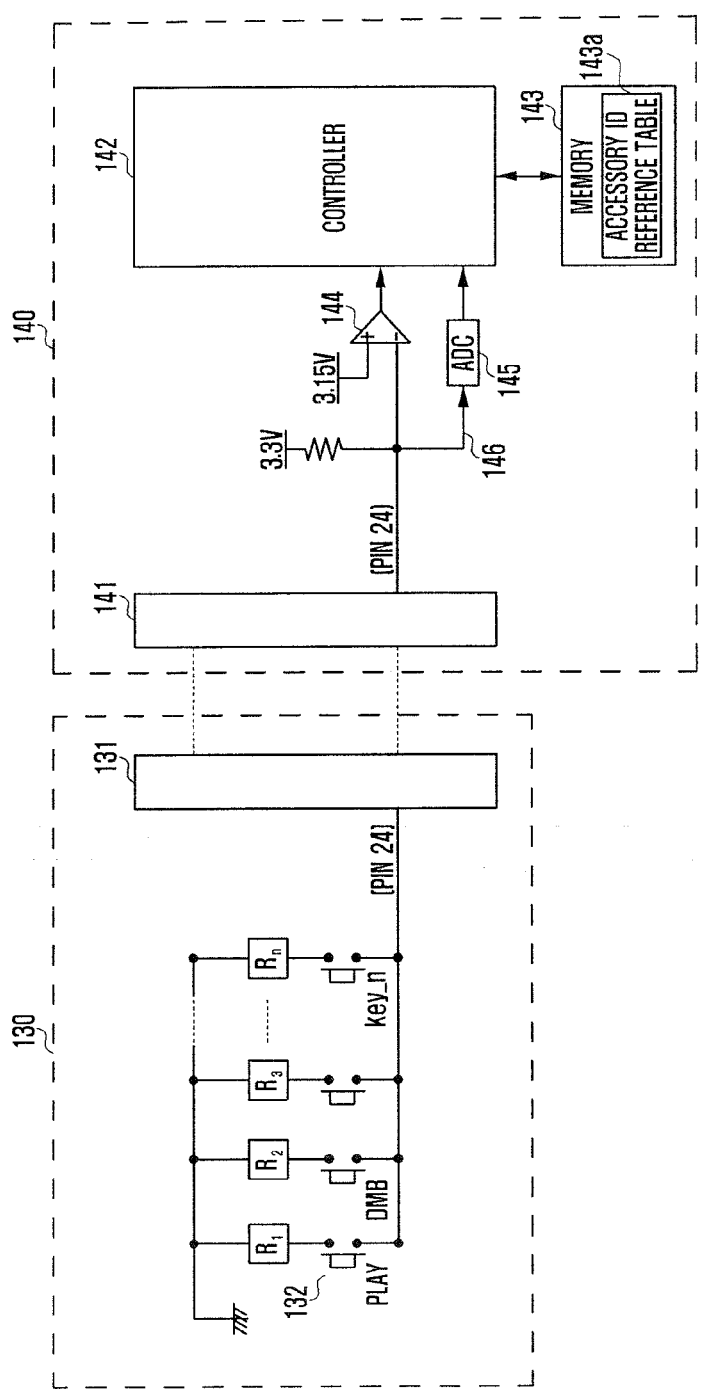
FIG. 10 is a block diagram illustrating a keypad and a mobile terminal according to an exemplary embodiment of the present invention and a docking station.

FIG. 10 is a block diagram illustrating a keypad and a mobile terminal according to an exemplary embodiment of the present invention.

Referring to FIG. 10, a keypad 130 may include a connector 131 with a twenty-fourth pin, a plurality of switches 132, and a plurality of resistors R1, R2, R3 . . . Rn, forming a plurality of sets. One terminal of each set connects with a ground and another terminal thereof connects with the twenty-fourth pin. Here, each of the plurality of resistors R1, R2, R3 . . . Rn has a key value, listed in Table 3 below.

TABLE 3

| No | ID resistance (KΩ, 1%) | A/D converter Input voltage (V) | Key definition |
|---|---|---|---|
| — | Open | 3.30 | Open |
| 1 | 100.0 | 3.00 | |
| 2 | 56.0 | 2.80 | REC |
| 3 | 36.0 | 2.58 | |
| 4 | 27.0 | 2.41 | FF or Channel UP |
| 5 | 20.0 | 2.20 | |
| 6 | 15.0 | 1.98 | REV or Channel Down |
| 7 | 12.0 | 1.80 | |
| 8 | 9.1 | 1.57 | Volume UP |
| 9 | 7.2 | 1.38 | |
| 10 | 5.6 | 1.18 | Volume DOWN |
| 11 | 4.3 | 1.00 | |
| 12 | 3.1 | 0.78 | DMB (hot key) or Radio |
| 13 | 2.2 | 0.60 | |
| 14 | 1.3 | 0.38 | PLAY/PAUSE/STOP |
| 15 | 0.56 | 0.18 | |
| 16 | 0.0 | 0.00 | SEND/END |

Referring to FIG. 10, a mobile terminal 140 may include a connector 141, a controller 142, a memory 143, a comparator 144, and an ADC 145. The connector includes a twenty-fourth pin. The controller 142 recognizes a type of a keypad 130 connected to the connector 141. The memory 143 stores a key value reference table 143a as listed in Table 3. When the keypad 130 connects with the connector 141, the comparator 144 generates and outputs an interrupt signal to the controller 142. The ADC 145 converts an analog signal input from a twenty-fourth pin into a digital signal and outputs the digital signal to the controller 142.

When a user pushes the keypad 130 to generate an interrupt signal from the comparator 144, the controller 142 compares a voltage input from a key value detection line 146 with a key value reference table 143a to recognize a type of a pushed key.

While the invention has been shown and described with reference to certain exemplary embodiments thereof, it will be understood by those skilled in the art that various changes in form and details may be made therein without departing from the spirit of the invention as defined by the appended claims and their equivalents.

What is claimed is:

1. An apparatus comprising:
    a connector including a first set of pins for data communication and a second set of pins for power charge; and
    a processor, operatively coupled with the connector, configured to:
        receive a voltage via at least one of the first set of pins,
        determine whether the voltage falls into a specified range,
        charge a battery operatively coupled with the apparatus using a first voltage or a first current based at least in part on a first determination that the voltage falls into the specified range, and
        charge the battery using a second voltage or a second current based at least in part on a second determination that the voltage does not fall into the specified range,
    wherein the processor is further configured to receive the first voltage or the first current via a first subset of the second set of pins, or the second voltage or the second current via a second subset of the second set of pins, wherein the first subset comprises a first pin, and the second subset comprises a second pin, and wherein the battery is charged faster when charged through the first pin than when charged through the second pin.

2. The apparatus of claim 1, wherein the processor is further configured to perform the receiving of the voltage based at least in part on receiving another voltage via at least one of the second set of pins.

3. The apparatus of claim 1,
wherein the connector is further configured to receive the voltage via an electronic device external to the apparatus, and
wherein the processor is further configured to determine a type of the electronic device based at least in part on the voltage.

4. The apparatus of claim 3, wherein the processor is further configured to determine the type of the electronic device as a dedicated adapter based at least in part on a determination that the voltage corresponds to a reference value.

5. The apparatus of claim 3, wherein the processor is further configured to determine the type of the electronic device as a non-dedicated adapter based at least in part on a determination that the voltage does not correspond to a reference value.

6. The apparatus of claim 3, wherein the processor is further configured to determine the type of the electronic device as a data cable with a charging function based at least in part on a determination that a signal corresponding to the voltage comprises a differential signal.

7. The apparatus of claim 1, wherein the processor is further configured to refrain from charging the battery based at least in part on a determination that power received via at least one of the second set of pins falls into a specified range.

8. The apparatus of claim 1, wherein the connector comprises:
a third set of pins to be used to control multimedia content being displayed via a display operatively coupled with the apparatus.

9. The apparatus of claim 1, wherein the connector comprises:
a third set of pins to be used to identify an accessory operatively coupled with the apparatus.

10. The apparatus of claim 9, wherein the accessory comprises at least one of an earphone, a headphone, a camera, a keypad, a mouse, a docking station, a data cable, a data cable with a charging function, an adapter, a charger, an external hard disk, or a universal serial bus memory.

11. A method comprising:
receiving, at an electronic device including a connector including a first set of pins for data communication and a second set of pins for power charge, a voltage via at least one of the first set of pins;
determining whether the voltage falls into a specified range;
charging a battery operatively coupled with the electronic device using a first voltage or a first current based at least in part on a first determination that the voltage falls into the specified range; and
charging the battery using a second voltage or a second current based at least in part on a second determination that the voltage does not fall into the specified range,
wherein the charging of the battery comprises receiving the first voltage or the first current via a first subset of the second set of pins, or the second voltage or the second current via a second subset of the second set of pins, wherein the first subset comprises a first pin, and the second subset comprises a second pin, and wherein the battery is charged faster when charged through the first pin than when charged through the second pin.

12. The method of claim 11, wherein the receiving of the voltage is performed based at least in part on receiving another voltage via at least one of the second set of pins.

13. The method of claim 11,
wherein the connector receives the voltage via another electronic device external to the electronic device, and
wherein the determining of whether the voltage falls into a specified range comprises determining a type of the other electronic device based at least in part on the voltage.

14. The method of claim 13, wherein the type of the other electronic device is determined as a corresponding one of a dedicated adapter, a non-dedicated adapter, or a data cable based at least in part on a value of the voltage.

15. A non-transitory machine-readable storage device storing instructions that, when executed by at least one processors, cause the at least one processors to perform operations comprising:
receiving, at an electronic device including a connector including a first set of pins for data communication and a second set of pins for power charge, a voltage via at least one of the first set of pins;
determining whether the voltage falls into a specified range;
charging a battery operatively coupled with the electronic device using a first voltage or a first current based at least in part on a first determination that the voltage falls into the specified range; and
charging the battery using a second voltage or a second current based at least in part on a second determination that the voltage does not fall into the specified range,
wherein the charging of the battery comprises receiving the first voltage or the first current via a first subset of the second set of pins, or the second voltage or the second current via a second subset of the second set of pins, wherein the first subset comprises a first pin, and the second subset comprises a second pin, and wherein the battery is charged faster when charged through the first pin than when charged through the second pin.

16. An apparatus comprising:
a connector including a first set of pins for data communication and a second set of pins for power charge; and
a processor, operatively coupled with the connector, configured to:
receive a voltage via at least one of the first set of pins,
determine whether the voltage falls into a specified range,
charge a battery operatively coupled with the apparatus using a first voltage or a first current based at least in part on a first determination that the voltage falls into the specified range, and
charge the battery using a second voltage or a second current based at least in part on a second determination that the voltage does not fall into the specified range,
wherein the processor is further configured to receive the first voltage or the first current via a first subset of the second set of pins, or the second voltage or the second current via a second subset of the second set of pins, wherein the first subset comprises a first pin, and the second subset comprises a second pin, and wherein a first charging capacity corresponding to the first pin is greater than a second charging capacity corresponding to the second pin.

\* \* \* \* \*